April 19, 1966     M. C. EDLUND ETAL     3,247,072
NUCLEAR REACTOR AND METHOD OF OPERATING TO
VARIABLY MODERATE AND CONTROL SAME INVENTORS
Milton C. Edlund
Donald C. Schluderberg
BY
ATTORNEY United States Patent Office 3,247,072
Patented Apr. 19, 1966

3,247,072
NUCLEAR REACTOR AND METHOD OF OPERATING TO VARIABLY MODERATE AND CONTROL SAME
Milton C. Edlund and Donald C. Schluderberg, Lynchburg, Va., assignors to The Babcock & Wilcox Company, New York, N.Y., a corporation of New Jersey
Filed Dec. 8, 1961, Ser. No. 158,022
18 Claims. (Cl. 176—42)

The present invention relates in general to a nuclear reactor and more particularly to a method of operating a nuclear reactor wherein a hydrogen-bearing vapor is used to variably moderate and control the chain reaction.

In every nuclear reactor a quantity of fissionable material must be arranged as a core with sufficient mass and the proper configuration so it will undergo a self-sustaining fission-type chain reaction. Further, in a non-breeder type of reactor, it is necessary to provide fissionable material in the core in excess of that required to achieve the chain reaction in order to continue operation to compensate for the consumption of the fissionable material, or fuel, and the accumulation of neutron absorbing poison materials resulting from the fission process. This excess fuel generates a greater number of neutrons than required to maintain the self-sustaining fission-type chain reaction, and it is thus necessary to control these excess neutrons either by absorbing them or by permitting them to escape from the reactor without further promoting the chain reaction.

Control of these excess neutrons is carried out in reactors of the prior art by introducing into the cores thereof a neutron poison material, i.e., a material which absorbs neutrons without reproducing them. This method includes the use of movable control rods formed of a poison material such as hafnium or boron, or the use of a specified amount of such poison material which is placed permanently in the core or mixed with the reactor coolant.

Furthermore, the fissioning of the atoms which creates the chain reaction generates fast neutrons having a wide range of high velocities. It is known that for most reactors now contemplated the chain reaction is best promoted by the slower, or thermal, neutrons rather than by the fast neutrons. The thermal neutrons have a greater tendency to cause a fissionable atom to fission while the fast neutrons tend to completely escape from the core. Thus it has been found that it is necessary to moderate, or slow, the neutrons generated by the chain reaction so as to increase the number of thermal neutrons available to sustain the chain reaction. Prior art reactors have generally utilized moderating material such as graphite, beryllium oxide, heavy or ordinary water in the core to provide this moderation.

In most of the reactors of the prior art it has been necessary to combine the above methods of controlling the chain reaction. Thus, it has been necessary to provide movable control rods within the reactor with the associated mechanical equipment necessary to move them. They have been required primarily for regulation, shim and safety (scram) control to assure a safe, reliable method of starting, operating and shutting down the reactor. These control rods increase the cost and complexity of a reactor due to the mechanical components in the control rod drives. Furthermore, they create within the reactor core undesirable flux peaking due, in part, to the poison material in the control rod being movably positioned within the path of neutrons generated during the chain reaction, with resultant peaks in the temperature and in heat flux of the reactor core. Accordingly, reactors of the prior art are of necessity designed so that the maximum fuel clad surface temperature reached within the core, as a result of neutron flux peaking, is maintained within safe limits, with resultant lowering of the average operating temperature in the core as compared to the permissible temperatures if no such flux peaking occurred.

It is known that if the degree of such flux peaking were minimzed the average temperature and heat flux of the reactor core could safely be raised, with consequent increase in the final temperature of the cooling medium or an increase in power output for the same final temperature with improved cycle efficiencies.

Accordingly, the present invention discloses a method for variably controlling and moderating a nuclear reactor having a plurality of fissionable material-bearing fuel elements arranged as a core to undergo a self-sustaining fission-type chain reaction by introducing a hydrogen-bearing moderating vapor into the core, and regulating this reaction by varying the concentration of the hydrogen constituent in the core.

Additionally, a separate circuit is provided for passing a cooling fluid through the core to remove the heat generated therein.

Further, the moderating vapor may be steam and the proportionate concentration of hydrogen within the core may be varied by changing the density of the steam.

The various features of novelty which characterize our invention are pointed out with particularity in the claims annexed to and forming a part of this specification. For a better understanding of the invention, its operating advantages and specific objectives attained by its use, reference should be had to the accompanying drawing and descriptive matter in which we have illustrated and described preferred embodiments of the invention.

Figure 1:
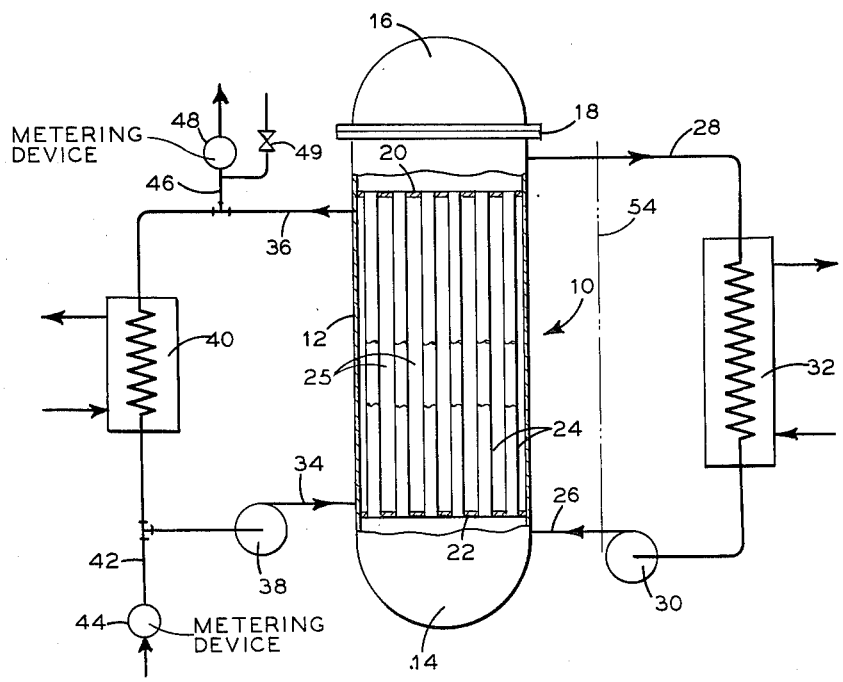
FIG. 1 is a schematic illustration of the reactor system of the present invention.

A schematic illustration of a reactor system of the present invention is presented in FIG. 1 wherein the reactor 10 is provided with a suitable pressure retaining vessel 12, shown here partly in section as an elongated cylindrical pressure vessel having suitable end closure members 14 and 16, one of which may be removably attached thereto as at flanged joint 18. The interior of the reactor pressure vessel 12 is divided into two spaces, a coolant space and a moderating space. One method of so dividing the interior of the pressure vessel is shown in the drawing and consists of upper and lower tube sheets 20 and 22, respectively, extending across and integrally attached to the upper and lower portions of the pressure vessel and having a plurality of tubes 24 extending therebetween and secured thereto. The coolant space is thus that space within the tubes and also the end portions of the pressure vessel outside the tube sheets 20 and 22. The moderating space 25 is that space enclosed between the two tube sheets exclusive of the space occupied by the tubes 24.

Fissionable material-bearing fuel elements (not shown), of a type well known in the art, are arranged within the tubes 24 as a core with a critical mass to undergo a self-sustaining fission-type chain reaction when moderated, as will be further described hereinbelow. In addition to the fissionable material-bearing fuel elements it is desirable that fertile material-bearing elements be also incorporated in the reactor core in a manner well known in the art. In this way the optimum in neutron utilization and economy may be obtained as will also be further discussed hereinbelow.

The coolant space is provided with inlet and outlet lines 26 and 28, respectively, so that primary coolant fluid may be circulated, as by a pump 30, through the tubes 24 in heat transfer relation with the fuel elements therein to remove the heat generated by the fission-type chain reaction. The heated primary fluid leaves the reactor pressure vessel 12 via the outlet line 28 and passes through a heat exchanger 32, giving up heat to a secondary heat transfer fluid in indirect heat transfer relation, the latter fluid being transported to a point of use, not shown. The cooled primary fluid, upon leaving the heat exchanger 32, is returned to the reactor by the pump 30 via inlet line 26.

The moderating space is supplied with a moderating vapor via inlet and outlet lines 34 and 36, respectively, which may be circulated by a pump 38 in the inlet line. A heat exchanger 40 may be positioned in the moderating vapor circulating circuit, or loop, to remove heat absorbed by the moderator vapor in its passage through the moderating space of the reactor core and thus maintain the vapor temperature and pressure substantially constant in this closed loop for a given power output. A moderator supply line 42, provided with a metering device 44, opens into the pump 38, thence into the inlet line 34 of the moderator circulating loop. An exhaust line 46 having a metering device 48 in communication with the outlet line 36 is also provided in the moderator loop.

The metering devices 44 and 48 may be of any type well known in the art and may include metering valves or positive displacement pumps, the primary requirement of such metering devices being that they must be capable of introducing or withdrawing accurate, predetermined amounts of moderating vapor into or out of the moderator circuit, as required, to permit controllable variation of the concentration of moderating vapor within the moderating space 25 of the reactor.

Almost any heat transfer fluid may be used as a primary coolant fluid, including steam or other gas, pressurized light or heavy water, organic fluids, liquid metals, or molten salts. While many of these primary coolant liquids may provide some degree of neutron moderation, it is preferable for moderation to rely on the moderating vapor capacity of the moderator loop, and the core of the reactor should be arranged accordingly, as is well known in the art. The moderating vapor may be any hydrogen-bearing vapor and may include steam, vaporous hydrocarbons, or free hydrogen or mixtures of these with inert gases.

Figure 4:
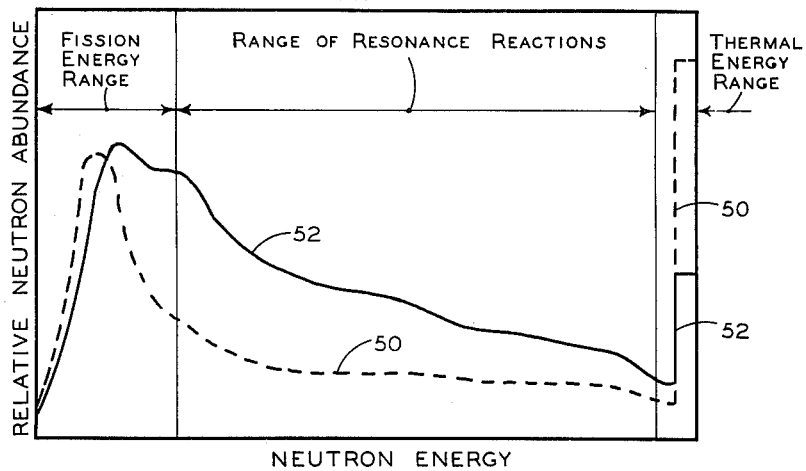
FIG. 4 is a graphical representation of neutron abundance vs. neutron energy.

It is known that in a nuclear reactor when fuel material undergoes fissioning neutrons having a wide range of energy are generated. As shown in FIG. 4, there is a relatively wide variation in relative neutron abundance with respect to neutron energy. As the neutrons are created by the fissioning of an atom, they have a comparatively high energy. As they move outwardly from the atom being fissioned, they are moderated or slowed by the various materials within the reactor, including both structural and moderating material. As these neutrons are slowed they pass through the resonance reaction energy range wherein fertile material may capture the neutrons and thus create fissionable material out of the fertile material. Further down the neutron energy range, i.e. following the resonance reaction range, there is the thermal energy range wherein most fissionable material reacts with the neutrons there present to undergo a fission reaction. It has been found that the relative abundance of neutrons within the range of resonance reactions and within the thermal energy range may be altered by varying the amount of moderation to which the neutrons are subjected. Thus, if the neutrons are subjected to a comparatively high amount of moderation the relative abundance of neutrons within the various energy ranges will approximate that shown by line trace 50 in FIG. 4. According to this, it will be seen that the neutron abundance within the thermal energy range is relatively high while that within the resonance reaction range is relatively low. Conversely, should the amount of moderation be relatively low, the range of abundance of neutrons within the various energy ranges will approximate that indicated by line trace 52 in FIG. 4, wherein it may be seen that the abundance of neutrons in the thermal energy range is relatively lower than in the former case while neutron abundance in the resonance reaction range is relatively higher. In a reactor during initial operation the amount of fuel material contained in the core is relatively high while the amount of neutron poisons is relatively low, thus it may operate within little neutron moderation since it requires less neutrons in the thermal energy range to sustain the fission-type chain reaction than will be necessary later in the core life span when the amount of fuel has substantially decreased, with a corresponding rise in fission product neutron poisons within the core. So it may be seen that where moderation is low, as indicated by line 52, the amount of neutrons available within the resonance reaction range is greater, making available more neutrons for reacting with the fertile material within the core to generate more fissionable fuel. Conversely, greater neutron moderation is required as the reactor ages and more neutrons are needed to sustain the fission-type chain reaction and the relative amount of neutrons available for reacting with the fertile material is less, as indicated by line 50. Thus it may be seen that the neutron utilization is enhanced by the use of varying amounts of neutron moderation according to the age of the reactor core. This is especially apparent when it is realized that, if such fertile moderation were not utilized in the reactor core, the amount of neutrons available in the thermal energy range would be varied by changing the amount of neutrons permitted to be absorbed non-productively in the core or which could escape from the reactor core. Accordingly, it is seen that operating economies may be realized by controlled utilization of those neutrons not needed for sustaining the chain reaction by reacting them with fertile material to generate new nuclear fuel rather than by just permitting them to be dissipated within the reactor.

It has been found that a reactor of the present invention may be operated and its output controlled by the introduction of steam of the order of 700° F. and 3000 p.s.i. into the moderating space. Steam of these characteristics when introduced into the moderating space of the reactor core will have a sufficient concentration of hydrogen atoms to provide the neutron moderation discussed above. Furthermore, by varying the density of the steam within the reactor core, the reactivity of the reactor may be controllably varied. This is accomplished by varying the inventory of steam in the moderating loop, which steam may be operated at nearly any combination of temperatures and pressures permitted by the materials of construction of the reactor. Should the desired operating pressure of the coolant fluid within the tubes 24 be considerably above the pressure necessary to obtain the required moderator vapor density, and it is advantageous to reduce the stresses imposed upon the tubes by the pressure differential thereacross, a non-moderating vapor or gas such as helium, nitrogen or $D_2O$ may be introduced into the moderator loop to provide the necessary partial pressure to raise the total pressure in the moderator loop and decrease the total pressure differential across the tube wall.

In all reactors of the prior art it has been necessary to utilize control rods for controlling excess reactivity and adjusting the power level of the reactor and for the purpose of terminating the chain reaction to shut the reactor down. As noted above, the use of control rods as a method of controlling a nuclear reactor has certain drawbacks, among them being flux peaking caused by the absorption of the neutrons by the control rod material. It may readily be seen that if flux peaking were minimized or eliminated the average power level and/or coolant outlet temperature of the core could be raised to a point much nearer the maximum permissible values, thus increasing the power output for a given size reactor. Additional limitations imposed by the use of control rods result from the complex mechanisms that are subjected to and must be operated in the presence of high temperature reactor coolants and which, in many cases render the associated apparatus difficult to properly service and maintain.

The variable control of the control rods is replaced in the present reactor by the variation of the hydrogen concentration in the moderating space as described above. The shut-down operation, with this type of control is accomplished by a relief valve 49 in the exhaust line 46. This valve may be either automatic or selectively operable as conditions dictate so that upon the reception of a "scram" signal from the reactor control system, in the case of a selectively operated valve, or the increase of the moderator vapor pressure above a predetermined set point, in the case of a pressure relief valve, the valve would open, venting the moderator circuit to a lower pressure receiver (not shown). The resultant reduction in pressure within the moderator space causes the concentration of hydrogen atoms and the corresponding degree of moderation to fall below the amount necessary to sustain the fission-type chain reaction thereby shutting down the reactor.

In initiating operation, the reactor and the associated moderator and coolant circuits are first brought to equilibrium operating temperature by imparting heat supplied from a suitable external heat source, not shown, to both the moderator and coolant fluids, and circulating them through the appropriate circuits by pumps 38 and 30, respectively. When the reactor has reached its operating temperature, additional moderator vapor is introduced into the moderator circuit through the inlet metering device 44 by way of inlet line 34, thereby increasing the density of the vapor within the moderator portion of the reactor core, with resultant increase in the neutron moderation to the point where reactor criticality is reached, coolant fluid is admitted to the coolant circuit in appropriate amounts to maintain the desired pressure differential between the moderator and coolant circuits and a self-sustaining fission-type chain reaction initiated. At this point the external heat source is no longer required. More vapor is then introduced as required into the moderator circuit thereby further increasing the vapor density, the neutron moderation and the power level of the reactor. The heat exchanger 32 in the primary coolant loop will then begin to extract heat produced within the reactor for conversion to useful work, producing power or some other useful end result.

In order to provide an extra factor of safety when the coolant has appreciable moderating ability, the moderator loop is operated at a pressure greater than in the coolant loop. In this way, should a leak occur within these circuits, the moderator fluid, as for example steam, will flow into the coolant loop decreasing the neutron moderation and reducing the output of the reactor. The upper limit of this pressure differential is governed largely by the need to limit the amount of structural material within the core. A typical range of values would be in the order of 450±200 p.s.i.

In this system the moderator circuit is conceived as simulating a sphere of constant volume. The variation of temperature or enthalpy of the steam circulated in the loop is held to a low value; similarly, the pressure drop in the loop is kept low so the absolute pressure in any part of the loop is kept nearly constant. Thus if there is a thermal unbalance between the heat added to the moderator in the reactor and the heat taken away from the moderator in the heat exchanger, the system pressure will rise or fall, but the density of the steam in the loop will remain constant. In other words, the loop is designed to stimulate a sphere containing a fixed quantity of steam at substantially uniform temperature and pressure throughout. Heating or cooling of the sphere and its contents will vary the pressure and temperature but not the density of the steam therein. It should be understood, however, that the mass of moderating vapor within the moderating loop may be varied over the life of the reactor core as dictated by the power output and the amount of moderation required.

Figure 3:
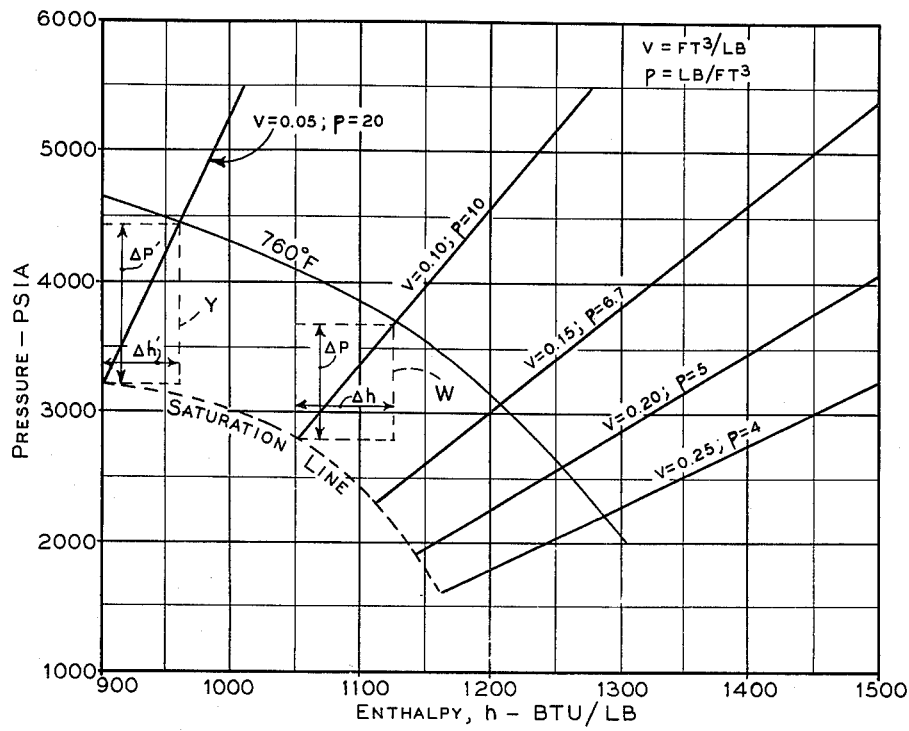
FIG. 3 is a graphical representation of steam density corresponding to various pressures and enthalpies.

Referring to FIG. 3, it may be seen that for a reactor requiring a density of moderating steam of approximately 10 pounds per cubic foot and operating at a temperature between saturation and 760° F., the moderator loop may be operated over a range of pressures, $\Delta P$, from about 2800 p.s.i.a. to 3700 p.s.i.a. if the enthalpy is maintained within a corresponding range of $\Delta h$ from about 1050 B.t.u./lb. to 1125 B.t.u./lb. as indicated by reference letter W. As the core of the reactor ages, with an increase in moderation required, the mass of the moderating vapor in the loop is increased so that the density of the vapor at the end of core life will be approximately 20 pounds per cubic foot. At that time, the moderating vapor, while being maintained within the same temperature range as before will now be operated over a range of pressure, $\Delta P'$, of 3200 p.s.i.a. to 4450 p.s.i.a. and a range of enthalpies, $\Delta h'$, of 900 B.t.u./lb. to 960 B.t.u./lb. as indicated by reference letter Y. While these values have been given as an example, it will be appreciated that the density of steam required will be dictated by the particular design of the reactor. However, it should be noted that the permissible upper temperature limit of the moderator vapor would be approximately 760° F. due to the temperature limitations of the structural material within the reactor. The lower temperature limit has been indicated as saturation due to the requirement that vapor only be contained within the moderator loop. The lower limit may be determined by the operating pressure of the coolant loop since, as set forth above, for safety reasons it is desirable to maintain the moderator loop at a pressure above that of thes coolant loop.

In the reactor as here described, utilizing steam both as the coolant and as the moderating vapor, the reactor will have a negative temperature coefficient of reactivity as a result of temperature changes of the coolant fluid. Accordingly, small changes in the reactivity of the reactor core will be overpowered, resulting in inherently safe operation, with the reactor self-regulating in adjusting itself to the output demand of the system. Thus, as the output demand increases, the coolant fluid temperature entering the reactor core will be reduced, thereby increasing its density and moderating effect with a resulting increase in reactor power output. Conversely, should the output demand of the system decrease the coolant fluid temperature returning to the reactor will be raised, decreasing its density and its moderating effect and reducing the power output to the point where equilibrium is again restored at the lower power output.

Figure 2:
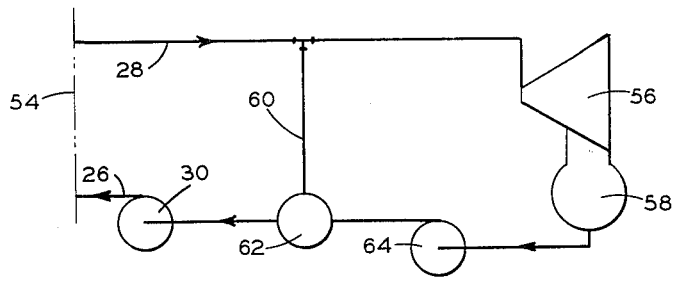
FIG. 2 is a portion of an alternate system which may be used with the reactor of FIG. 1.

While the reactor illustrated in FIG. 1 utilizes a closed loop system in which the coolant fluid gives up its heat indirectly through heat exchanger 32, the reactor may utilize an open cycle coolant loop as illustrated in FIG. 2. Accordingly, FIG. 2 shows a coolant loop which may be substituted for that portion of the coolant loop in FIG. 1 to the right of break-line 54 as referenced in the two figures. In this cycle the coolant fluid leaves the reactor by outlet line 28 going directly to a turbine 56. In order that high system efficiencies may be obtained it is desirable to utilize a condensing type turbine wherein the vapor is exhausted into a condenser 58 at a relatively low absolute pressure. However, to prevent pumping condensate liquid back into the reactor via inlet line 26 and feed pump 30, it is necessary to first vaporize the condensate fluid. This is done by employing the Loeffler cycle utilizing steam as the heat transfer medium. In this instance a portion of the reactor outlet steam by-passes the turbine, going directly to a vaporizing chamber 62 via line 60. The remainder of the steam is expanded through the turbine 56, exhausted into the condenser 58 and the condensate is then introduced by pump 64 into the vaporizing chamber 62. The condensate is converted to steam in chamber 62 by mixing with the by-passed steam from line 60. All of the vapor is then introduced into the reactor via the pump 30 and feed line 26.

It should be noted in FIGS. 1 and 2 that corresponding parts have the same reference numbers for ease of identification.

To illustrate the preferred embodiment of the invention, the below Table I gives details of the open cycle reactor described above:

*Table I*

| | |
|---|---|
| Reactor output | 750 mw. heat. |
| Net plant output | 315 mw. elec. |
| Plant thermal efficiency (net) | 42%. |
| U–235 loading | 1015 kg. |
| U–238 loading | 21,545 kg. |
| Fuel enrichment | 4.5%. |
| Average heat flux | 255,000 B.t.u./hr.-ft.$^2$. |
| Peak heat flux | 418,000 B.t.u./hr.-ft.$^2$. |
| Peak to average power ratio | 1.64. |
| Max. fuel clad surface temp. | 1109° F. |
| Fuel clad surface temp. at max. heat flux | 1010° F. |
| Number of fuel pins | 5800. |
| Length of fuel pins (active) | 12 ft. |
| Fuel clad material | 19–9DL (stainless alloy). |
| Specific power output | 310 kwe./kg. U–235. |
| Core life | 675 days. |
| Average fuel burnup | 19,500 mwd./ton. |
| Coolant fluid, steam: | |
| Flow | 7,071,500 lb./hr. |
| Pressure | 2950 p.s.i. |
| Inlet temp. | 710° F. |
| Outlet temp. | 1000° F. |
| Pressure drop through core | 100 p.s.i. |
| Moderator fluid, steam: | |
| Flow | 6,500,000 lb./hr. |
| Pressure at start of core life | 2160 p.s.i. |
| Avg. temp. at start of core life | 713° F. |
| Steam density at start of core life | 4.4 lb./ft.$^3$. |
| Pressure at start of core life | 3400 p.s.i. |
| Avg. temp. at start of core life | 703° F. |
| Steam density at start of core life | 14 lb./ft.$^3$. |

In this reactor, based on the above data, the active core would approximate a right circular cylinder having a diameter of about 8 feet and a height of 12 feet. Should it be desirable to incorporate the present invention in a reactor of smaller physical size, this could be accomplished by increasing the U$^{235}$ enrichment of the fuel and/or by increasing the pressure of the steam moderator vapor. Should lower moderation vapor pressures be desirable, a core containing fuel of somewhat lower enrichment and having a larger size could be used, or a core comparable in size but having a higher enrichment of U$^{235}$ could be operated at lower moderation vapor pressures.

With such a reactor, utilizing high temperature and pressure steam as a cooling fluid, it will be possible to utilize modern high efficiency power plant heat cycles and components rather than the lower pressure and temperature cycles associated with some of the reactors of the prior art.

Alternate arrangements and fluids readily present themselves as previously discussed above. Thus, should it be desirable to maintain the moderating circuit pressure and/or temperature substantially constant throughout the life of the core and yet adapt the moderating capacity of the moderating steam to the changing fuel conditions, it would be possible to use a mixture of steam and a suitable gas or gases as the moderator fluid. Such gases might be helium or $CO_2$ which would be practically inert in the neutron moderation sense. Another gas which may be used is $D_2O$ vapor which, compared with steam, would provide very little neutron moderation. $D_2O$ has the further advantage of providing good compatibility with steam. At the beginning of the core life, the partial pressure of the steam in the moderating circuit might be in the order of 1800 p.s.i. and the partial pressure of the inert gas 1500 p.s.i., giving a total pressure of 3300 p.s.i. As the core became expended the steam partial pressure could be increased while the gas partial pressure decreased, thereby varying the moderating effect but maintaining the total pressure constant.

Many variations present themselves when the various combinations of coolant fluids and moderating fluids are considered, the only limitations placed upon the cooling fluids being that they have desirable heat transfer characteristics and that they are compatible for use with structural materials available at the temperatures and pressures contemplated. It is necessary, of course, for the moderator fluid to contain a sufficient quantity of hydrogen atoms either free or in combination to provide the necessary amount of neutron moderation at practical working temperatures and pressures. Further, it is necessary that the moderating fluid be in a vaporous state at the working temperatures and pressures in order to provide the requisite variation in fluid density. This requirement for vaporized moderating fluid is necessary in order to obtain the safety "scram" control necessary merely by venting the moderating circuit to a lower pressure through the quick opening relief valve.

In line with the above, it may readily be seen that hydrocarbon vapors can be used as the moderating fluid. While the operating pressures of hydrocarbon vapor moderators would generally be lower than those required using steam moderation, the basic theory and mode of operation would still be the same. Additionally, the use of hydrocarbon vapors as a moderating fluid would make possible the adoption of neutron irradiation in the refining and production of petroleum products or other chemical compounds. For example, acetylene or benzene vapors could be used as the moderating vapor while undergoing changes to higher polymer hydrocarbons by means of chemonuclear reactions.

A further modification of the present invention envisions the use of only fissionable material-bearing fuel elements in the reactor core. Such a reactor would be one in which neutron economy is of only secondary interest, the primary objective being a reactor having a high power output from a relatively small and compact size. In this adaptation the variation in the moderator density would change only the amount of neutron leakage out of the reactor core to variably control the fission-type chain reaction.

An additional modification is realized when the method of control of the reactor herein described is combined with the prior art method of moderation, namely, the use of a static, built-in type of moderator, such as graphite or zirconium-hydride. Such an arrangement would be similar to the graphite-moderated, gas-cooled reactors, well known in the art, except that the moderation provided by the graphite would not be permitted to be sufficient to make the reactor core critical. The final amount of moderation necessary to make the reactor critical would be supplied by the hydrogen-bearing moderator vapor described above. In this way it would still be possible to variably control, and even to shut down the chain reaction by varying the density of the moderating vapor.

Additionally, the present invention may be utilized in a reactor having a central core region arranged to undergo fission reactions as a result of fast neutrons generated by the fission process. Such a fast core region would be surrounded by a thermal blanket region which, in turn, is surrounded by a neutron reflector. While a fast core region has no requirement of neutron moderation, it is controlled by the variation of neutron moderation within the thermal blanket region. This is due to the fact that the amount of neutrons being reflected into the fast core region will be determined by the number of neutrons slowed by moderation in the thermal region and entering into thermal fission reactions. Such neutron moderation as taught by the present invention results in higher neutron efficiencies for use in such a fast-thermal core than would be the case should other prior art moderating methods be used.

While in accordance with the provisions of the statutes we have illustrated the best forms and modes of operation of the invention now known to us, those skilled in the art will understand that changes may be made in the form of the apparatus without departing from the spirit of the invention covered by our claim, and that certain features of our invention may sometimes be used to advantage without a corresponding use of other features.

We claim:

1. The method of operating a heterogeneous nuclear reactor having a plurality of fissionable material-bearing fuel elements arranged to undergo a self-sustaining fission-type chain reaction, said fuel elements being arranged in a fixed lattice as a core, said core having a plurality of fixed regular flow channels therethrough, comprising the steps of supplying a single phase hydrogen-isotope-bearing vapor which undergoes a change in density with a change in pressure and enthalpy to said core, circulating said vapor independently of said fuel elements through said fixed regular flow channels in said core in heat transfer relationship with said fuel elements to moderate said chain reaction while maintaining said vapor in a single phase throughout said core, and regulating the fission-type chain reaction by controllably varying the density of said vapor in said core.

2. The method of operating a nuclear reactor according to claim 1 wherein the concentration of said hydrogen-isotope is varied in said core by varying the concentration of hydrogen-isotope in said vapor.

3. The method of operating a heterogeneous nuclear reactor having a plurality of fissionable material-bearing fuel elements arranged to undergo a self-sustaining fission-type chain reaction, said fuel elements being arranged in a fixed lattice as a core, said core having a plurality of fixed regular flow channels therethrough, comprising the steps of supplying single phase steam to said core, circulating said steam through said fixed regular flow channels in said core to moderate said chain reaction while maintaining said steam in a single phase throughout said core, and controllably varying the density of said steam in said core to regulate the fission-type chain reaction.

4. The method of operating a nuclear reactor according to claim 3 wherein said steam contains $H_2O$ and $D_2O$, and varying the proportion of $H_2O$ and $D_2O$ in said steam in said core to regulate the chain reaction.

5. A method of operating a heterogeneous nuclear reactor having a plurality of fissionable material-bearing fuel elements arranged to undergo a self-sustaining fission-type chain reaction, said fuel elements being arranged in a fixed lattice as a core, said core having a plurality of fixed regular flow channels therethrough, comprising the steps of introducing a single phase hydrogen-isotope-bearing vapor into a closed circuit including said core and circulating said vapor therethrough while maintaining said vapor in a single phase throughout said core, increasing the amount of vapor in said circuit until the density of said vapor in said core is sufficient to moderate the neutrons there present so that a self-sustaining fission-type chain reaction is initiated, circulating said vapor through said core to remove the heat generated therein by said chain reaction, removing heat from said vapor at a point in said closed circuit removed from said core, and controlling the reactivity of said core by increasing the amount of vapor in said circuit to increase the vapor density in said core to raise the power level of the reactor and by decreasing the amount of vapor in the circuit to decrease the vapor density in said core to lower the power level of the reactor.

6. The method of operating a nuclear reactor according to claim 5 wherein said hydrogen-isotope-bearing vapor is steam.

7. The method of operating a nuclear reactor according to claim 6 wherein said steam contains $H_2O$ and $D_2O$, and varying the proportion of $H_2O$ and $D_2O$ in said steam throughout the life of the reactor.

8. The method of operating a nuclear reactor according to claim 6 wherein the temperature and pressure of said steam in said core are maintained at least above the critical point.

9. The method of operating a heterogeneous nuclear reactor having a plurality of fissionable material-bearing fuel elements arranged to undergo a self-sustaining fission-type chain reaction, said fuel elements being arranged in a fixed lattice as a core, said core having a plurality of fixed regular flow channels therethrough, comprising the steps of supplying single phase steam to said core, circulating said steam through said fixed regular flow channels in said core while maintaining said steam in a single phase throughout said core, and controllably varying the density of said steam in said core to vary the power level of the reactor and to control reactivity throughout core lifetime.

10. The method of operating a nuclear reactor according to claim 9 wherein said steam is in the super-critical state.

11. The method of operating a nuclear reactor according to claim 9 wherein the steam contains $H_2O$ and $D_2O$, and the proportion of $H_2O$ and $D_2O$ in said steam is controllably varied to regulate reactivity while maintaining the temperature of the steam substanially constant.

12. A heterogeneous nuclear reactor comprising a body of fissionable material arranged as a plurality of fuel elements in a core to undergo a self-sustaining fission-type chain reaction, said fuel elements being arranged in a fixed lattice in said core, said core having a plurality of fixed regular flow channels therethrough, conduit means forming a flow circuit including said core, means for supplying a single phase hydrogen-isotope-bearing vapor which undergoes a change in density with a change in pressure and enthalpy to said flow circuit, means for circulating said vapor through said circuit while maintaining said vapor in a single phase throughout said core, and means for controllably varying the concentration of said hydrogen-istope in said core to control the fission-type chain reaction, said means for varying the concentration of said hydrogen-isotope in said core including means for varying the density of said vapor in said core.

13. A nuclear reactor as claimed in claim 12 wherein said means for varying the concentration of hydrogen-isotope in said core includes means for varying the concentration of hydrogen-isotope in said vapor.

14. A nuclear reactor as claimed in claim 12 wherein said hydrogen-isotope-bearing vapor is steam.

15. A heterogeneous nuclear reactor comprising a body of fissionable material arranged as a plurality of fuel elements in a core to undergo a self-sustaining fission-type chain reaction, said fuel elements being arranged in a fixed lattice in said core, said core having a plurality of fixed regular flow channels therethrough conduit means forming a flow circuit including said core, means for supplying single phase steam and a non-moderating gas to said flow circuit, means including a pump for circulating said steam and said gas through said circuit while maintaining said steam in a single phase throughout said core, means for controllably varying the partial pressures of said steam and said gas to vary the density of steam in said core to control the fission-type chain reaction.

16. A heterogeneous nuclear reactor comprising a body of fissionable material arranged in a fixed lattice as a plurality of fuel elements in a core to undergo a self-sustaining fission-type chain reaction, a body of neutron moderating material arranged in said core to moderate said core to a point less than criticality, conduit means forming a flow circuit including said core, means for supplying single phase steam to said flow circuit, means for circulating said steam through said circuit while maintaining said steam in a single phase throughout said core, and means including a valve in said circuit for varying the density of steam in said core to establish and control the fission-type chain reaction.

17. A heterogeneous nuclear reactor comprising a pressure vessel divided into at least two sections, a plurality of fissionable material-bearing fuel elements arranged in a fixed lattice as a core in a first section of said pressure vessel, said core arranged to undergo a self-sustaining fission-type chain reaction, means for passing coolant steam through said first section in heat transfer contact with said fuel elements to superheat said coolant steam by removing heat generated in said core by said chain reaction, conduit means forming a closed circuit including said second section of said pressure vessel, said second section extending through said core, means for supplying high temperature high pressure moderating steam to said second section of said pressure vessel, means for circulating said moderating steam through said second section in said core while maintaining said moderating steam in a single phase throughout said core to moderate said chain reaction, means for regulating the density of said moderating steam in said core to control the fission-type chain reaction, and a valve means in said closed circuit operable to relieve the pressure therein to reduce the density of said moderating steam sufficiently to terminate said chain reaction.

18. A heterogeneous nuclear reactor comprising a pressure vessel divided into at least two sections, a plurality of fissionable material-bearing fuel elements arranged in a fixed lattice as a core in a first section of said pressure vessel to undergo a self-sustaining fission-type chain reaction, conduit means forming a closed circuit including a second section of said pressure vessel extending through said core, means for supplying $H_2O$ and $D_2O$ containing steam to said closed circuit including said core, pump means for circulating said steam through said circuit while maintaining said steam in a single phase throughout said core, means for increasing the amount of steam in said circuit until the density of said steam in said core is sufficient to moderate the neutrons there present so that a self-sustaining fission-type chain reaction is initiated, means for increasing the pressure and temperature of said steam to at least above the critical point, means including a valve for increasing the amount of supercritical steam in said circuit to increase the steam density in said core to raise the power level of the reactor, said pump means arranged to circulate said supercritical steam through said core to remove the heat generated therein by said chain reaction, a heat exchange means arranged in said closed circuit at a point removed from said core to remove heat from said supercritical steam, valve means in said closed circuit for decreasing the amount of supercritical steam in said circuit to decrease the steam density in said core to lower the power level of the reactor, means for varying the proportion of $H_2O$ and $D_2O$ in said supercritical steam throughout the life of the reactor to vary the moderation of the neutrons in said core, and means for circulating a second body of steam through said first section of said pressure vessel to remove the major portion of heat generated in said core.

References Cited by the Examiner

UNITED STATES PATENTS

| 2,936,273 | 5/1960 | Untermyer | 60—108 |
| 2,999,059 | 9/1961 | Treshow | 176—42 |
| 3,071,527 | 1/1963 | Young | 176—52 |
| 3,081,246 | 3/1963 | Edlund | 176—42 |

FOREIGN PATENTS

| 131,782 | 5/1940 | Australia. |
| 749,064 | 5/1956 | Great Britain. |
| 963,161 | 7/1964 | Great Britain. |

OTHER REFERENCES

HW–59684, March 18, 1959, pp. 3–6 and 7–17. Publ. by AEC.

Schultz I: Proceedings of 1953 Conference, on Nuclear Engineering, Univ. of Calif., Berkeley, Sept. 11, 1953, pp. D–1 to D–8.

Schultz II: Control of Nuclear Reactors and Power Plants, Mar. 6, 1961, pp. 251, 252, 253. Publ. by McGraw-Hill.

CARL D. QUARFORTH, *Primary Examiner.*

REUBEN EPSTEIN, *Examiner.*